US011906998B2

(12) United States Patent
Agarwal et al.

(10) Patent No.: US 11,906,998 B2
(45) Date of Patent: Feb. 20, 2024

(54) NMOS SUPER SOURCE FOLLOWER LOW DROPOUT REGULATOR

(71) Applicant: Apple Inc., Cupertino, CA (US)

(72) Inventors: Reetika Kumari Agarwal, Sunnyvale, CA (US); Abbas Komijani, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 17/483,005

(22) Filed: Sep. 23, 2021

(65) Prior Publication Data

US 2023/0091785 A1 Mar. 23, 2023

(51) Int. Cl.
*G05F 1/575* (2006.01)
*G05F 1/59* (2006.01)

(52) U.S. Cl.
CPC ................ *G05F 1/575* (2013.01); *G05F 1/59* (2013.01)

(58) Field of Classification Search
CPC .................................. G05F 1/59; G05F 1/575
See application file for complete search history.

(56) References Cited

U.S. PATENT DOCUMENTS 9,946,283 B1 * 4/2018 Yung ...................... G05F 1/575
10,152,072 B1 12/2018 Elhebeary et al.
10,281,943 B1 * 5/2019 Ho .......................... G05F 1/575
10,554,218 B1 * 2/2020 Seesink ................. H03M 3/458
2021/0318703 A1 * 10/2021 Jin .......................... G05F 1/575

FOREIGN PATENT DOCUMENTS

CN 105045329 B 10/2016
CN 107491129 B 11/2018
CN 215117309 U * 12/2021
EP 2894538 A2 * 7/2015 ............... G05F 1/56
KR 20180112929 A * 10/2018
WO WO-2018148708 A1 * 8/2018 ......... H03K 17/0406

* cited by examiner

*Primary Examiner* — Sisay G Tiku
(74) *Attorney, Agent, or Firm* — Fletcher Yoder, P.C.

(57) ABSTRACT

Embodiments disclosed herein relate to a low-voltage dropout regulator and more specifically to improving a power supply rejection ratio (PSRR) of the low dropout voltage regulator. The low dropout voltage regulator may be used to generate various voltages for integrated circuits of an electronic device. In some cases, a P-type metal-oxide-semiconductor (PMOS) low dropout (LDO) voltage regulator may be used. However, the PMOS LDO may not provide a sufficient PSRR or reduction in supply noise. To address these issues, an N-type metal-oxide-semiconductor (NMOS) LDO voltage regulator having an NMOS pass transistor may be used. The NMOS LDO may provide a lower impedance than the PMOS LDO. Further, the NMOS LDO may provide an increased bandwidth and consume a smaller physical area than the PMOS LDO.

20 Claims, 6 Drawing Sheets

NMOS SUPER SOURCE FOLLOWER LOW DROPOUT REGULATOR

BACKGROUND

The present disclosure relates generally to wireless communication, and more specifically, to voltage regulators in wireless communication devices.

A wireless communication device may include multiple different integrated circuits, such as amplifiers, mixers, transceivers, data converters, and the like. A voltage input level of each integrated circuit may be different based on the functions performed by the various integrated circuits. A voltage regulator may be used to generate each of the various voltage levels. In some cases, a low dropout regulator may be used to generate the various voltage levels. For example, a P-type metal-oxide-semiconductor (PMOS) low dropout (LDO) voltage regulator may be used. The PMOS LDO may be used in any suitable part of the electronic device such as an amplifier, mixer, transceiver, data converter, a low noise amplifier, and the like. However, in some cases, the PMOS LDO may not provide a sufficient power supply rejection ratio (PSRR) or reduction in supply noise for the electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As discussed above, a P-type metal-oxide-semiconductor (PMOS) low dropout (LDO) voltage regulator may be used to generate various voltage levels for various functions performed by various integrated circuits of an electronic device. However, in some cases, the PMOS LDO may not provide a sufficient power supply rejection ratio (PSRR) or reduction in supply noise. The PMOS LDO (e.g., the second transistor) may also consume a relatively large physical area on various integrated circuits of the electronic device.

In the presently disclosed embodiments, an N-type metal-oxide-semiconductor (NMOS) LDO voltage regulator having an N-type pass transistor may be used. A topology of the NMOS LDO may be similar to a topology of the PMOS LDO. However, differences between the NMOS LDO and the PMOS LDO are discussed herein. Advantageously, the NMOS LDO may provide improved (e.g., increased) PSRR, increased bandwidth, and improved rejection of supply noise. Further, a physical size of the NMOS LDO may be smaller than the PMOS LDO and thus conserve physical space in the electronic device.

In one embodiment, a low dropout voltage regulator is presented which includes a current source and an n-type transistor. A gate of the n-type transistor is coupled to the current source and a first source of the n-type transistor is coupled to a second source of a p-type transistor. The p-type transistor includes a drain coupled to the gate of the n-type transistor. The low dropout voltage regulator also includes a compensation capacitor coupled to the current source, the gate of the n-type transistor, and the drain of the p-type transistor.

In another embodiment, a low dropout voltage regulator is presented. The low dropout voltage regulator includes a first current source and a compensation capacitor coupled to the first current source. A buffer transistor of the low dropout voltage regulator has a first gate, a first source, and a first drain. The first gate of the buffer transistor is coupled to the compensation capacitor. The low dropout voltage regulator also includes a second current source coupled to the first source of the buffer transistor. The low dropout voltage regulator also includes an n-type transistor with a second gate, a second source, and a second drain. The second gate of the n-type transistor is coupled to the second current source and the first source of the buffer transistor. The second source of the n-type transistor is coupled to an output of the low dropout voltage regulator. The low dropout voltage regulator also includes a p-type transistor with a third source coupled to the output of the low dropout voltage regulator and a third drain coupled to the first gate of the buffer transistor.

In yet another embodiment, an electronic device in presented. The electronic device includes a primary low dropout voltage regulator. The primary low dropout voltage regulator includes a first current source and an n-type transistor with a first gate coupled to the first current source. A first source of the n-type transistor is coupled to an output of the primary low dropout voltage regulator. The primary low dropout voltage regulator also includes a p-type transistor with a second source coupled to the first source of the n-type transistor. A first drain of the p-type transistor is coupled to the first gate of the n-type transistor. The electronic device also includes a secondary low dropout voltage regulator coupled to the primary low dropout voltage regulator via a resistor and a second current source. The second current source is configured to control an input voltage of the secondary low dropout voltage regulator from the primary low dropout voltage regulator.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
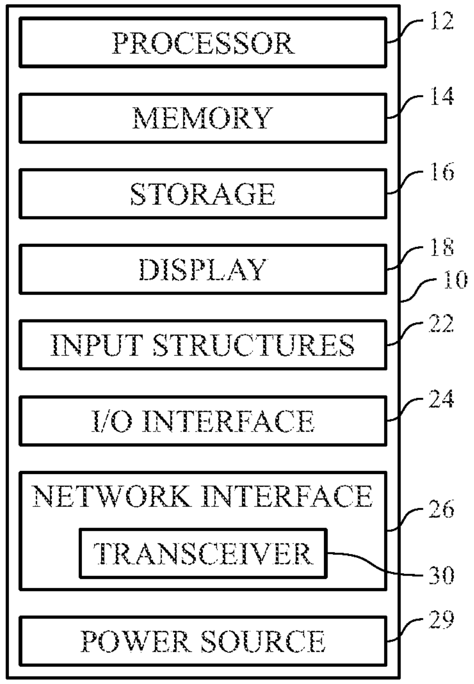
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to improving a power supply rejection ratio (PSRR), providing an increased bandwidth, and improving rejection of supply noise of a low dropout (LDO) voltage regulator of the electronic device. Further, embodiments herein provide an LDO with a reduced physical size to maintain or reduce an overall physical size of the electronic device. To do so, embodiments herein provide an N-type (e.g., conduction type) metal-oxide-semiconductor (NMOS) low dropout (LDO) voltage regulator having an NMOS pass transistor. An impedance of the NMOS LDO may be reduced compared to an impedance of a P-type (e.g., conduction type) metal-oxide-semiconductor (PMOS) low dropout (LDO) voltage regulator. In particular, the NMOS LDO may be used in any suitable part of the electronic device to support an improved power supply rejection ratio (PSRR), an improved noise rejection, and an improved bandwidth. For example, the NMOS LDO discussed herein may be disposed in an amplifier, mixer, transceiver, data converter, a low noise amplifier, and the like. It should be understood that one or more transistors discussed herein may operate as a switch and thus may be representative of a switch.

Further, a compensation capacitor of the NMOS LDO may be smaller than a compensation capacitor of the PMOS LDO. A size of the compensation capacitor of the NMOS LDO may be reduced because a dominant pole of the NMOS LDO may be larger than the dominant pole of the PMOS LDO. That is, a smaller compensation capacitor may be used because the dominant pole of the NMOS LDO may be increased as a result of the N-type pass transistor. As a result of the smaller compensation capacitor, a bandwidth of the NMOS LDO is increased compared to the PMOS LDO. The bandwidth of the NMOS LDO may also be increased as a result of the reduced impedance of the NMOS LDO compared to an impedance of the PMOS LDO.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface (e.g., a wireless interface) 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network and/or wireless interface 26, and/or the power source 29 may each be communicatively coupled directly or indirectly (e.g., through or via another component, a communication bus, a wireless connection, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network and/or wireless interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network and/or wireless interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FIC), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network and/or wireless interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network and/or wireless interface 26 may include a transceiver 30. In some embodiments, all or portions of the transceiver 30 may be disposed within the processor 12. The transceiver 30 may support transmission and receipt of various wireless signals via one or more antennas. Thus, the transceiver may include a transmitter and a receiver. The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
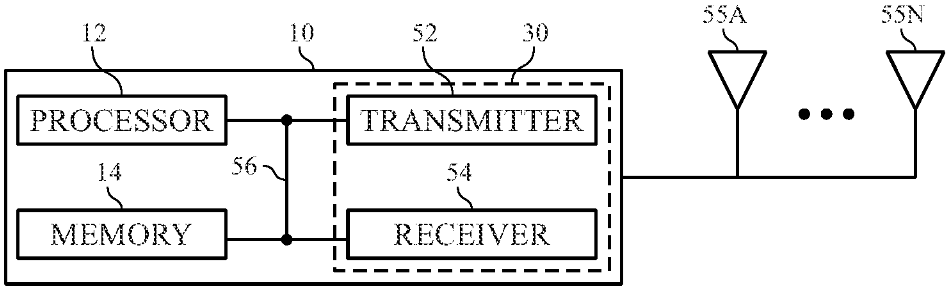
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

While FIGS. 1 and 2 describe a transceiver, it should be understood that an N-type metal-oxide-semiconductor (NMOS) low dropout (LDO) voltage regulator as discussed herein may be part of any suitable part of the electronic device, such as the processor 12, the memory 14, the storage 16, the display 18, the input structures 22, the I/O interface 24, the power source 29, and so on of the electronic device. In particular, the NMOS LDO may be used in any suitable part of the electronic device to support an improved power supply rejection ratio (PSRR), an improved noise rejection, and an improved bandwidth. For example, the NMOS LDO discussed herein may be disposed in an amplifier, mixer, transceiver, data converter, a low noise amplifier, and the like.

Figure 3:
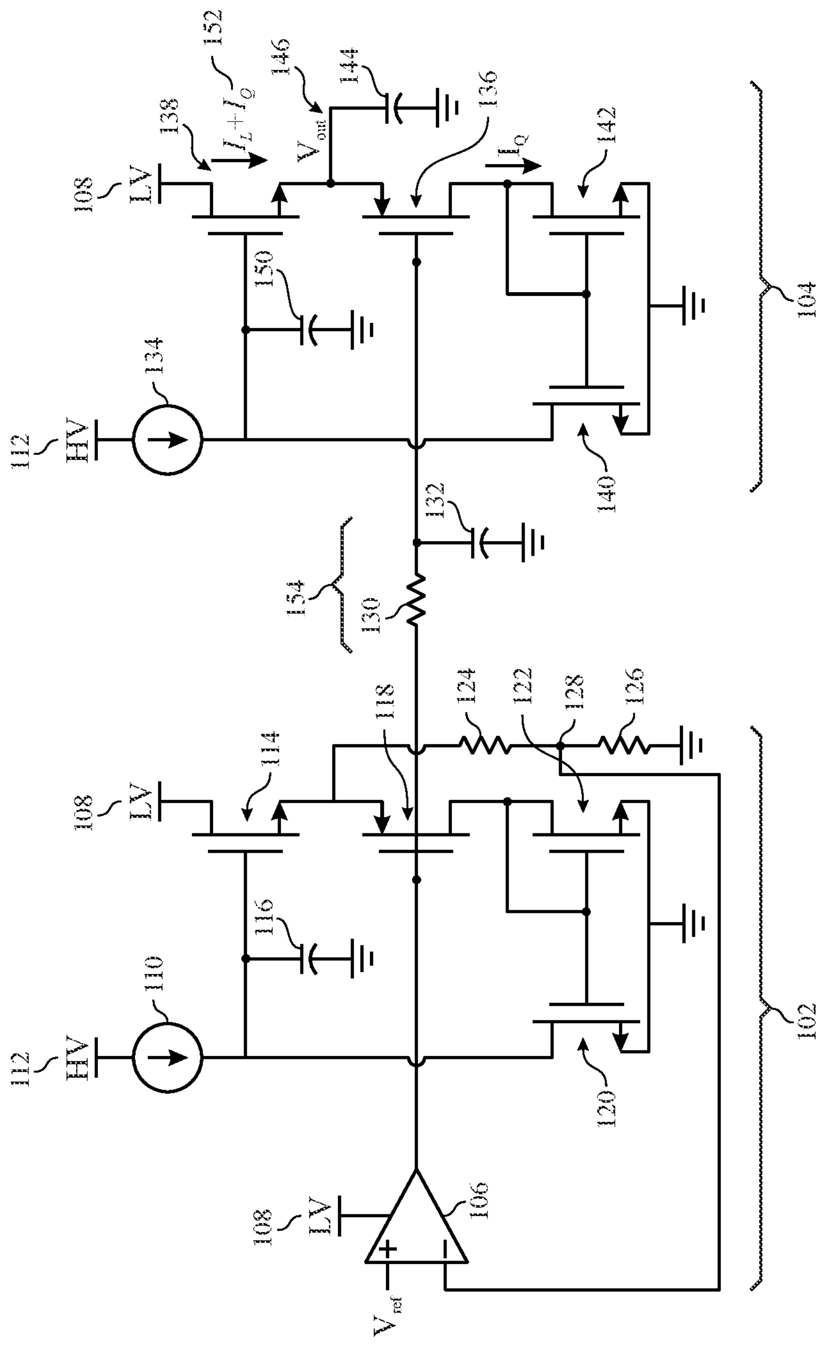
FIG. 3 is a circuit diagram of an example primary-secondary architecture of an N-type metal-oxide-semiconductor (NMOS) low dropout (LDO) voltage regulator of the electronic device of FIG. 1, according to embodiments of the present disclosure.

FIG. 3 is a circuit diagram of an example primary-secondary architecture 100 of an N-type metal-oxide-semiconductor (NMOS) low dropout (LDO) voltage regulator of the electronic device of FIG. 1, according to embodiments of the present disclosure. The architecture 100 may be used in any suitable component of the electronic device 10, such as part of the processor 12, the network interface 26, the transceiver 30, the transmitter 52, the receiver 54, and/or the power source 29, as shown in FIG. 1 and/or FIG. 2. In additional or alternative embodiments, the architecture 100 may be included in any suitable integrated circuit, DSP, general-purpose microprocessor, microcontroller, FPGA, PLD, and/or controller of the electronic device 10. As shown, the architecture 100 includes a primary NMOS LDO 102 and a secondary NMOS LDO 104. The secondary NMOS LDO 104 may be substantially similar to the primary NMOS LDO 102. It should be understood that the architecture 100 is merely an example and that many other architectures may be possible. For example, the architecture may include a number of secondary NMOS LDOs 104 coupled to the primary NMOS LDO 102.

The architecture 100 includes an operation amplifier 106 coupled to the primary NMOS LDO 102 and the secondary NMOS LDO 104. The operation amplifier 106 may provide a reference voltage ($V_{ref}$) to the primary NMOS LDO 102 and the secondary NMOS LDO 104. The primary NMOS LDO 102 may include a number of N-type transistors 114, 120, 122 and a P-type transistor 118. The operational amplifier 106 may provide the reference voltage ($V_{ref}$) to a gate of the transistor 118. The current source 110 is coupled to a gate of the transistor 114 and a drain of the transistor 120. The gate of the transistor 114 is also coupled to the drain of the transistor 120. A source of the transistor 114 is coupled to a source of the transistor 118 and to one or more resistors 124, 126 of a feedback loop via a node 128 disposed between the resistors 124, 126. A drain of the transistor 118 may be coupled to a drain and gate of the transistor 122. The drain of the transistor 118 may also be coupled to a gate of the transistor 120. A source of the transistor 120 and a source of the transistor 122 may be coupled to ground. It should be noted that the architecture 100 is merely an example and that different arrangements of transistors having different conduction types (e.g., n-type vs p-type) may be possible.

The transistor 114 may selectively couple the one or more resistors 124, 126 of the feedback loop to a low voltage (LV) 108 based on a high voltage (HV) 112 and a current source 110. The resistors 124, 126 may form a resistive voltage divider and may be used to determine an output voltage of the primary NMOS LDO 102. The transistor 118 may selectively couple the transistors 120, 122 to the low voltage 108 based on the reference voltage $V_{ref}$ from the operational amplifier 106.

The secondary NMOS LDO 104 may include a number of N-type transistors 138, 140, 142 and a P-type transistor 136. The operational amplifier 106 may provide the reference voltage ($V_{ref}$) to a gate of the transistor 136. The current source 134 is coupled to a gate of the transistor 138 and a drain of the transistor 140. The gate of the transistor 138 is also coupled to the drain of the transistor 140. A source of the transistor 138 is coupled to a source of the transistor 136. A drain of the transistor 136 may be coupled to a drain and gate of the transistor 142. The drain of the transistor 136 may also be coupled to a gate of the transistor 140. A source of the transistor 140 and a source of the transistor 142 may be coupled to ground. An output 146 of the secondary NMOS LDO 104 may be measured between the source of the transistor 138 and the source of the transistor 136.

The architecture 100 may include a noise filter 154. The noise filter 154 may include a resistor 130 disposed between the primary NMOS LDO 102 and the secondary NMOS LDO 104. The noise filter 154 may also include a capacitor 132 coupled to the resistor 130. In combination, the resistor 130 and the capacitor 132 may filter noise from the reference voltage $V_{ref}$ from the operational amplifier 106. It should be understood that other noise filtering techniques and apparatus may be used to filter noise from the reference voltage $V_{ref}$.

The primary NMOS LDO 102 includes a compensation capacitor 116 disposed between and coupled to the current source 110 and the transistor 114. The compensation capacitor 116 may generate a dominant pole of the primary NMOS LDO 102. The dominant pole may refer to a frequency at which a slope of a magnitude curve of the NMOS LDO decreases by about 20 decibels (dB) per decade (e.g., the voltage gain falls by ten times (to one-tenth of its previous value) for every decade (tenfold) increase in frequency). A size of the compensation capacitor 116 may be small (e.g., relative to a compensation capacitor of a PMOS LDO as discussed below) and thus may provide an increased bandwidth of the NMOS LDO 102. The secondary NMOS LDO 104 may also include a compensation capacitor 150 disposed between and coupled to a respective current source 134 and transistor 138 of the secondary NMOS LDO 104. The compensation capacitor 150 of the secondary NMOS LDO 104 may function substantially the same as the compensation capacitor 116 of the primary NMOS LDO 102.

A current 152 through the transistor 138 may be equal to a sum of a load current $I_L$ and a quiescent current $I_Q$. The quiescent current $I_Q$ may account for a difference between an input current of the NMOS LDO 104 and the output current of the NMOS LDO 104. In some cases, the load current may be greater than the quiescent current $I_Q$ by a factor in a range between about 10 and 100, for example a factor of about 80. Advantageously, the NMOS pass transistor 138 provides a low impedance with a high rejection of supply noise. Further, the NMOS pass transistor 138 may have a low output impedance due to the load current $I_L$. The high gain of the NMOS pass transistor 138 may be used to achieve a high PSRR of the LDO without wasting (e.g., consuming excessive) power.

Figure 4A:
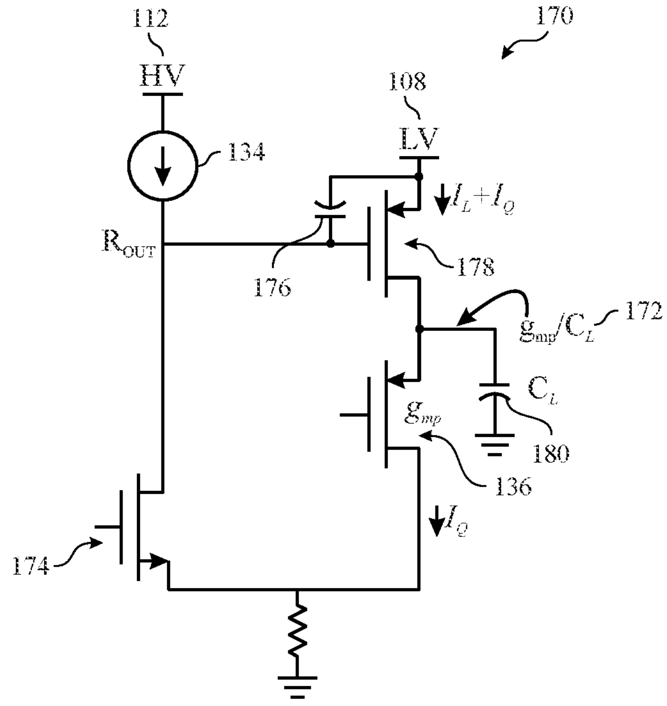
FIG. 4A is a circuit diagram of an example P-type metal-oxide-semiconductor (PMOS) low dropout (LDO) voltage regulator of the electronic device of FIG. 1, according to embodiments of the present disclosure.

FIG. 4A is a circuit diagram of an example P-type metal-oxide-semiconductor (PMOS) low dropout (LDO) voltage regulator 170 of the electronic device of FIG. 1, according to embodiments of the present disclosure. As shown, the PMOS LDO 170 includes a number of P-type transistors 178, 136. A first transistor 178 may selectively couple an output 172 of the PMOS LDO 170 to a low voltage LV 108 based at least in part on a high voltage 112. A parasitic capacitance 176 may exist between a drain and a gate of the first transistor 178. Additionally, a capacitive load 180 may exist at the output 172. A second transistor 136 may selectively couple a feedback loop via a third transistor 174 to the low voltage LV 108 based an input of the PMOS LDO 170.

As shown, a gate of the transistor 178 is coupled to the current source 134 and a drain of the transistor 174. The source of the transistor 178 may be coupled to the gate of the transistor 178 via parasitic capacitance 176. A drain of the transistor 178 is coupled to a source of the transistor 136. A drain of the transistor 136 and a source of the transistor 174 are coupled to ground. The output 172 of the PMOS LDO 170 may be measured between the drain of the transistor 178 and the source of the transistor 136.

A PSRR of the PMOS LDO 170 may be determined differently based on a frequency of the input signal. For example, if the frequency is equal to or less than the frequency of the dominant pole, the PSRR of the PMOS LDO may be determined by a first transfer function:

$$\frac{V_{out}}{V_s} \sim \frac{1}{g_{mp} R_{out}} \quad \text{(Equation 1)}$$

where $V_{out}$ is a voltage supplied to the load 180, $V_s$ is a supply voltage of the PMOS LDO 170, $g_{mp}$ is a gain across the P-type transistor 178, and $R_{out}$ is an output resistance of the PMOS LDO 170. If the frequency is greater than the dominant pole, the PSRR of the PMOS LDO may be determined by a second transfer function:

$$\frac{V_{out}}{V_s} \sim \frac{1}{1 + g_{mp} r_{ds}} \quad \text{(Equation 2)}$$

where $r_{ds}$ is a "drain-source on resistance" or a total resistance between a drain and a source of the transistor 178. A non-dominant pole of the PMOS LDO 170 may be determined by the quiescent current $I_Q$.

In operation, the transistor 138 may provide an output current to the load 144. In some embodiments, the load current may be between approximately 2 milliamps (mA) and approximately 25 mA, such as approximately 10 mA. The transistor 136 may provide a low impedance and generate a loop gain to suppress a supply noise of the input of the PMOS LDO 170. In doing so, the transistor 136 may consume approximately 0.5 mA. However, the PMOS LDO 170 may not provide sufficient power supply rejection ratio (PSRR) or reduction in supply noise. The power supply rejection ratio (PSRR) may refer to a capability of an LDO to suppress input power variations. The PMOS LDO 170 may also consume a relatively large physical area on various integrated circuits of the electronic device 10.

Figure 4B:
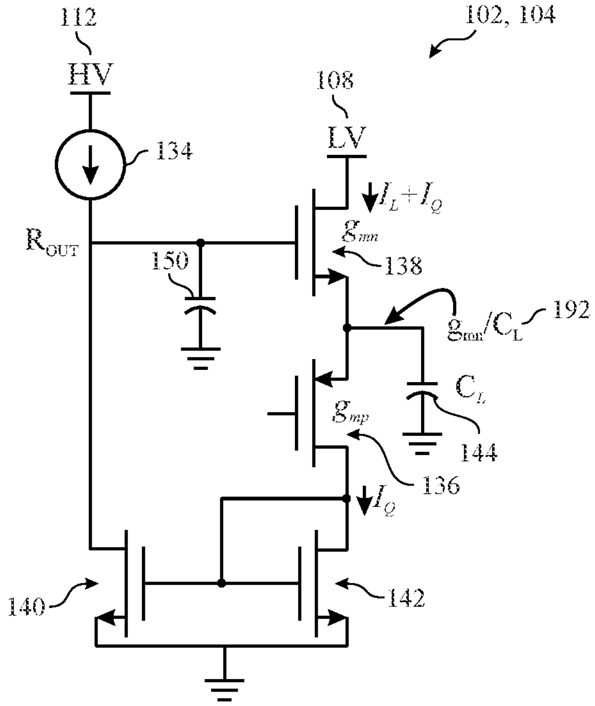
FIG. 4B is circuit diagram of the N-type metal-oxide-semiconductor (NMOS) low dropout (LDO) of FIG. 3, according to embodiments of the present disclosure.

FIG. 4B is circuit diagram of the N-type metal-oxide-semiconductor (NMOS) low dropout (LDO) 102, 104 of FIG. 3, according to embodiments of the present disclosure. The NMOS LDO 102, 104 may be similar to the PMOS LDO 170 of FIG. 4A. However, the NMOS LDO 102, 104 includes the N-type transistors 138, 140, 142 and the compensation capacitor 150. The NMOS LDO may also include the P-type transistor 136 disposed between and coupled to the transistors 138 and 142. The transistor 138 may selectively provide a load current similar to that of the transistor 178 of the PMOS LDO 170 of FIG. 4A. However, the transistor 138 may have a low output impedance compared to the transistor 178 of the PMOS LDO 170. Thus, an impedance of the NMOS LDO 102, 104 may be less than an impedance of the PMOS LDO 170 of FIG. 4A. Advantageously, the lower impedance of the NMOS LDO 102, 104 may result in an increased bandwidth.

As discussed above with respect to FIG. 3, the current source 134 is coupled to the gate of the transistor 138 and the drain of the transistor 140. The gate of the transistor 138 is also coupled to the drain of the transistor 140. The source of the transistor 138 is coupled to the source of the transistor 136. The drain of the transistor 136 may be coupled to the drain and the gate of the transistor 142. The drain of the transistor 136 may also be coupled to the gate of the transistor 140. The gate of the transistor 140 may be coupled to the gate of the transistor 142. The source of the transistor 140 and the source of the transistor 142 may be coupled to ground. An output 192 of the NMOS LDO 102, 104 may correspond to the output 146 of FIG. 3 and may be measured between the source of the transistor 138 and the source of the transistor 136.

As discussed above, the compensation capacitor 150 may generate a dominant pole of the NMOS LDO 102, 104. Moreover, the compensation capacitor 150 may increase a physical size of the NMOS LDO 102, 104 compared to the PMOS LDO 170 of FIG. 4A. However, a capacitance, and thus a physical size, of the compensation capacitor 150 may be reduced when the dominant pole of the NMOS LDO 102, 104 is less than the dominant pole of the PMOS LDO 170.

As discussed with respect to the PMOS LDO 170 of FIG. 4A, a PSRR of the NMOS LDO 102, 104 may be computed differently based on a frequency of the input signal. For example, if the frequency is less than the dominant pole of the NMOS LDO 102, 104, the PSRR of the NMOS LDO 102, 104 may be computed by the transfer function:

$$\frac{V_{out}}{V_s} \sim \frac{1}{g_{mp} g_{mn} r_{ds} R_{out}} \quad \text{(Equation 3)}$$

where $g_{mn}$ is a gain across the N-type transistor 138, $g_{mp}$ is a gain across the P-type transistor 136, $r_{ds}$ is a "drain-source on resistance" or a total resistance between a drain and a source of the transistor 178, and $R_{out}$ is an output resistance of the NMOS LDO 102, 104. Thus, the PSRR of the NMOS LDO 102, 104 at a frequency less than the dominant pole is improved over the PSRR of the PMOS LDO 170 (as shown by Equation 1 above) by a factor of $g_{mn} r_{ds}$. In this way, the NMOS LDO 102, 104 may achieve a higher supply rejection within a 3 dB bandwidth.

If the frequency is greater than the dominant pole, the PSRR of the NMOS LDO 104 may be determined by the transfer function:

$$\frac{V_{out}}{V_s} \sim \frac{1}{1 + (g_{mn} + g_{mp}) r_{ds}}. \quad \text{(Equation 4)}$$

Thus, the PSRR of the NMOS LDO 102, 104 at a frequency greater than the dominant pole is improved over the PSRR of the PMOS LDO 170 (as shown by Equation 4 above) by a factor of $g_{mn}/g_{mp}$.

A non-dominant pole of the NMOS LDO 102, 104 may be determined by the load current $I_L$. That is, the NMOS LDO 102, 104 may use the load current $I_L$ (rather than the quiescent current $I_Q$ of the PMOS LDO 170) to improve a closed-loop bandwidth and suppress supply noise at higher frequencies (e.g., frequencies greater than the dominant pole). Moreover, supply noise in the NMOS LDO 102, 104 modulates a drain of the N-type pass transistor 138 while supply noise in the PMOS LDO 170 modulates a source of the P-type pass transistor 178.

Advantageously, an impedance of the NMOS LDO 104 may be less than an impedance of a PMOS LDO 170. Thus, a bandwidth of the NMOS LDO 104 may be improved relative to the bandwidth of the PMOS LDO 170. The bandwidth of the NMOS LDO 104 may be further improved due to the smaller compensation capacitor 150 of the NMOS LDO 104. In some cases, the compensation capacitor 150 of the NMOS LDO 102, 104 may be three to five times smaller than a compensation capacitor of the PMOS LDO 170.

At some operating frequencies, a noise rejection of the NMOS LDO 102, 104 may be improved over a noise rejection of the PMOS LDO 170. For example, the NMOS LDO 102, 104 may provide an improved noise rejection in a range of about 25 percent to about 50 percent over the PMOS LDO 170. At some operating frequencies, the noise rejection of the NMOS LDO 102, 104 may be similar to the noise rejection of the PMOS LDO 170. In other words, the NMOS LDO 102, 104 may at least maintain the noise rejection compared to the PMOS LDO 170.

Figure 5:
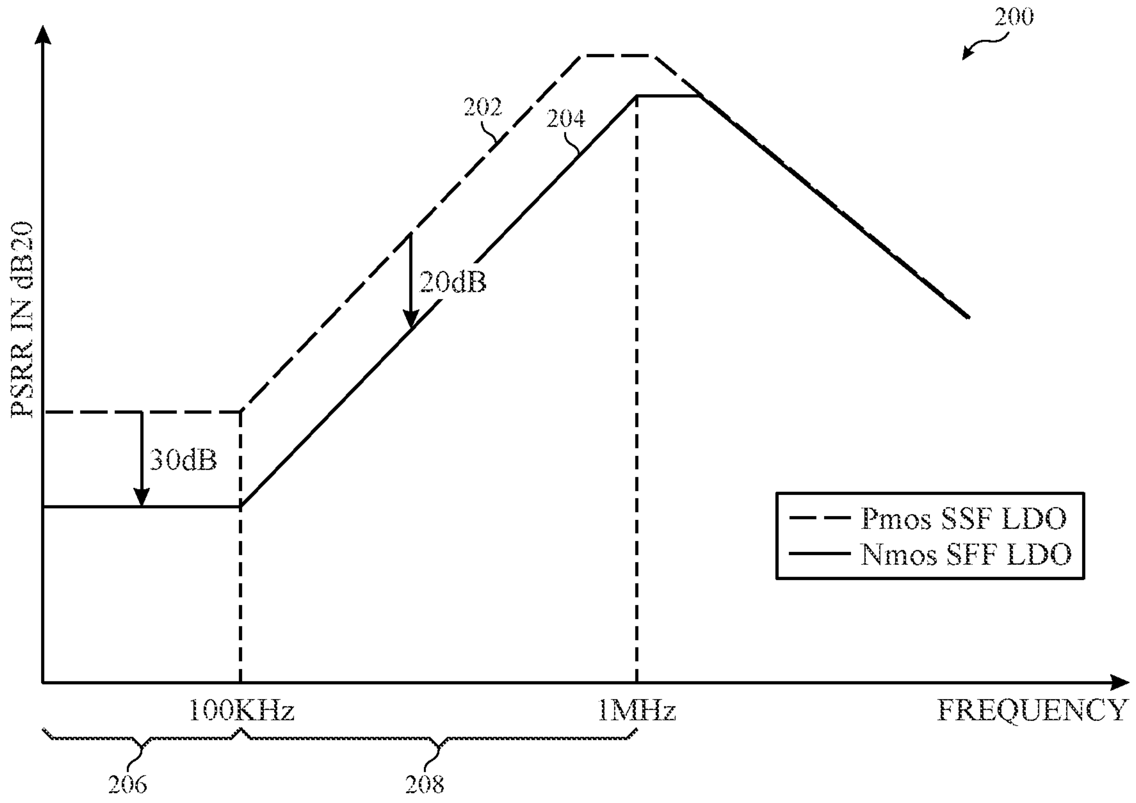
FIG. 5 is a graph illustrating a comparison of a power supply rejection ratio (PSRR) of the PMOS LDO of FIG. 4A and the NMOS LDO of FIG. 4B, according to embodiments of the present disclosure.

FIG. 5 is a graph 200 illustrating a comparison of a power supply rejection ratio (PSRR) of the PMOS LDO 170 of FIG. 4A and the NMOS LDO 104 of FIG. 4B, according to embodiments of the present disclosure. As shown, the graph 200 illustrates a power supply rejection ratio (PSRR) 202 for the PMOS LDO 170 of FIG. 4A and a PSRR 204 for the NMOS LDO 104 of FIG. 4B. As an example, a dominant pole of the PMOS LDO 170 and the NMOS LDO 104 may be at a first frequency $f_1$. Thus, the PSRR of the PMOS LDO 170 and the NMOS LDO 102, 104 may be different for a frequency range 206 below the dominant pole and a frequency range 208 above the dominant pole. In some cases, the first frequency $f_1$ may be about 100 kHz. A second frequency $f_2$ of a second pole of the PMOS LDO 170 and the NMOS LDO 104 may be about 1 megahertz (MHz).

The graph 200 depicts the PSRR 204 of the NMOS LDO 104 below the PSRR 202 of the PMOS LDO 170 because the PSRR value is negative. Thus, even though the PSRR 204 of the NMOS LDO 104 is below the PSRR 202 of the PMOS LDO 170, the rejection is increased because the PSRR 204 provides an additional rejection. Thus, for a frequency below the dominant pole (e.g., less than the first frequency $f_1$), the PSRR 204 of the NMOS LDO is improved by about 30 dB over the PSRR 202 of the PMOS LDO 170. For a frequency above the dominant pole (e.g., a frequency greater than the first frequency $f_1$), the PSRR 204 of the NMOS LDO is improved by about 20 dB over the PSRR 202 of the PMOS LDO 170.

Figure 6:
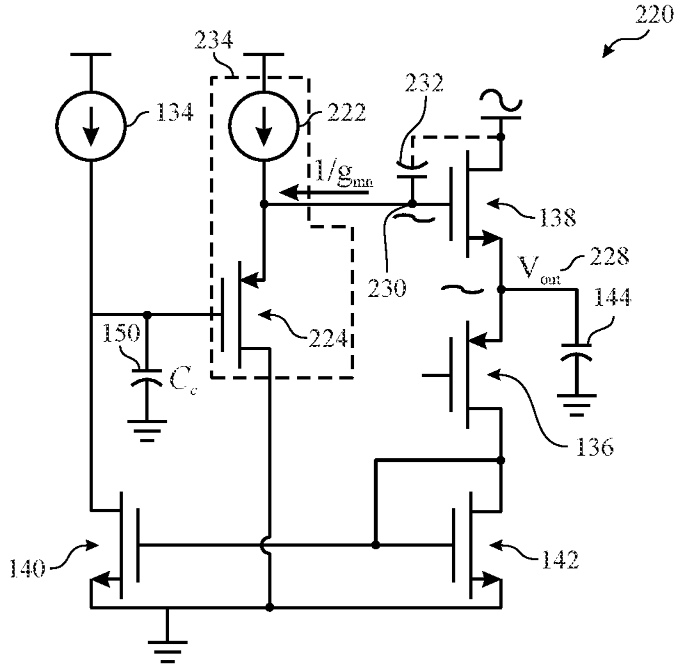
FIG. 6 is a circuit diagram of an NMOS LDO of FIG. 4B with a source follower, according to embodiments of the present disclosure.

FIG. 6 is a circuit diagram 220 of an NMOS LDO 102, 104 of FIG. 4B with a source follower 234, according to embodiments of the present disclosure. The NMOS LDO 102, 104 with the source follower 234 may further increase PSRR over that of the NMOS LDO of 102, 104 of FIG. 4B. However, the NMOS LDO 102, 104 with the source follower 234 of FIG. 6 may consume more power than the NMOS LDO 102, 104 of FIG. 4B. Thus, the NMOS LDO 102, 104 with the source follower 234 illustrated in FIG. 6 may be used in limited applications when a higher PSRR is desired.

The source follower 234 (e.g., buffer) includes a current source 222 coupled to a buffer transistor 224. A drain of the buffer transistor 224 is coupled to ground and a source of the buffer transistor 224 is coupled to a gate of the transistor 138 and the current source 222. A gate of the buffer transistor 224 is coupled to the current source 134 and a drain of the transistor 140. The current source is also coupled to the gate of the transistor 138. A source of the transistor 138 is coupled to a source of the transistor 136 and the output 228 of the NMOS LDO 220. A drain of the transistor 136 is coupled to a drain and gate of the transistor 142. The drain of the transistor 136 is also coupled to a gate of the transistor 140. A source of the transistor 140 and a source of the transistor 142 are coupled to ground. As shown, the buffer transistor 224 is P-type transistor.

As shown, the current source 222 and the buffer transistor 224 are disposed between the N-type transistor 138 and the compensation capacitor 226. In this way, the current source 222 and the buffer transistor 224 of the source follower 234 reduce a supply noise at a node 230 coupled to the gate of the transistor 138 by a factor of approximately $1/g_m$, where $g_m$ is a gain of the N-type pass transistor 138. The noise at the node 230 may be determined by:

$$\frac{1/g_m}{1/g_m + 1/sC_p} \qquad \text{(Equation 5)}$$

where $C_p$ is a capacitance of a parasitic capacitance across the transistor 138. That is, the source follower 234 of FIG. 6 reduces an impedance at a gate of the transistor 138 which reduces the parasitic capacitance $C_p$ noise coupling to an output 228 of the NMOS LDO 102, 104. In some cases, the source follower 234 of the NMOS LDO 102, 104 of FIG. 6 reduces the PSRR of the NMOS LDO 102, 104 by about 10 dB.

Figure 7:
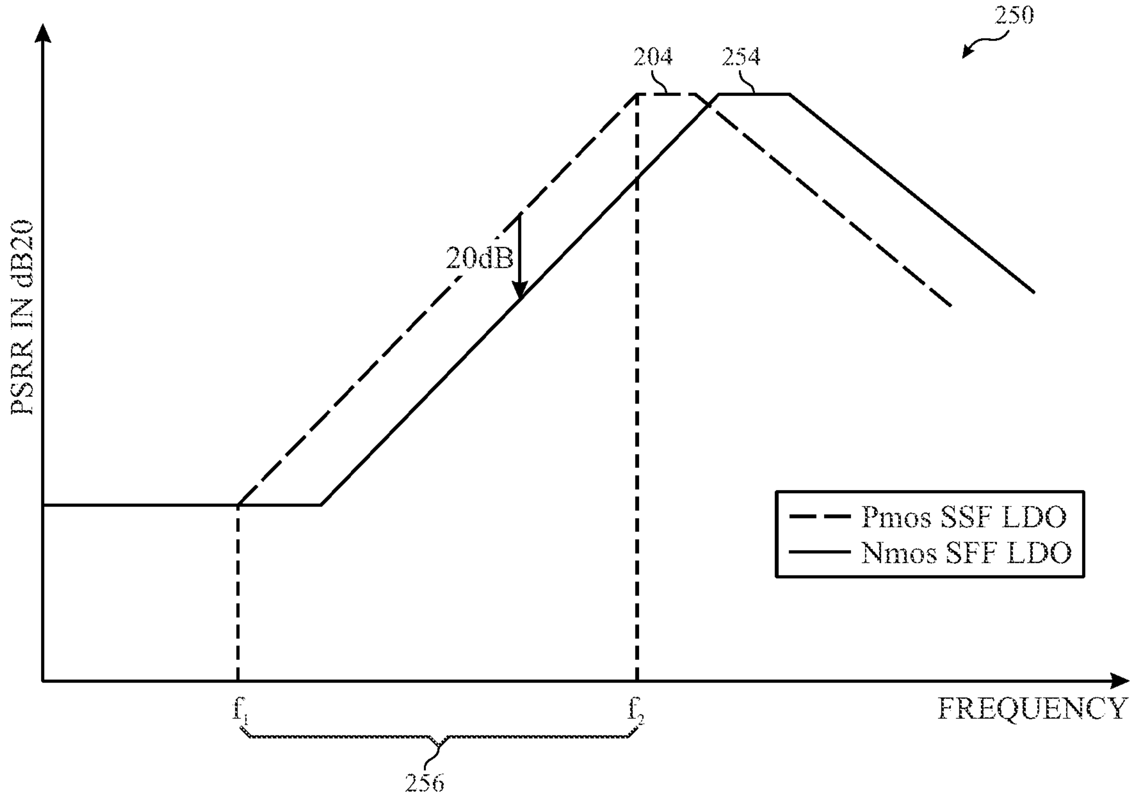
FIG. 7 is a graph illustrating a comparison of a power supply rejection ratio (PSRR) of the NMOS LDO of FIG. 4B and the NMOS LDO with the source follower of FIG. 6, according to embodiments of the present disclosure.

FIG. 7 is a graph 250 illustrating a comparison of a power supply rejection ratio (PSRR) of the NMOS LDO 102, 104 of FIG. 4B and the NMOS LDO 102, 104 with the source follower 234 of FIG. 6, according to embodiments of the present disclosure. As shown, the graph 250 illustrates a PSRR 204 of the NMOS LDO 102, 104 of FIG. 4B and a PSRR 254 of the NMOS LDO 102, 104 with the source follower 234 of FIG. 6. As an example, a dominant pole of the NMOS LDO 102, 104 may be at a first frequency $f_1$. In some cases, the first frequency $f_1$ may be about 100 kHz. A non-dominant pole may be at a second frequency first frequency $f_2$ of, for example, about 1 MHz.

As shown in the graph 250, the PSRR 254 of the NMOS LDO 102, 104 with the source follower 234 of FIG. 6 is less than the PSRR 204 of the NMOS LDO 102, 104 of FIG. 4B by about 10 dB. That is, the PSRR 254 of the NMOS LDO 102, 104 with the source follower 234 is improved by about 10 dB over the PSRR of the NMOS LDO 102, 104 of FIG. 4B. In some cases, a peak PSRR frequency of the NMOS LDO 102, 104 may be increased by about 1.5 times due to the added source follower 234 of FIG. 6.

Figure 8:
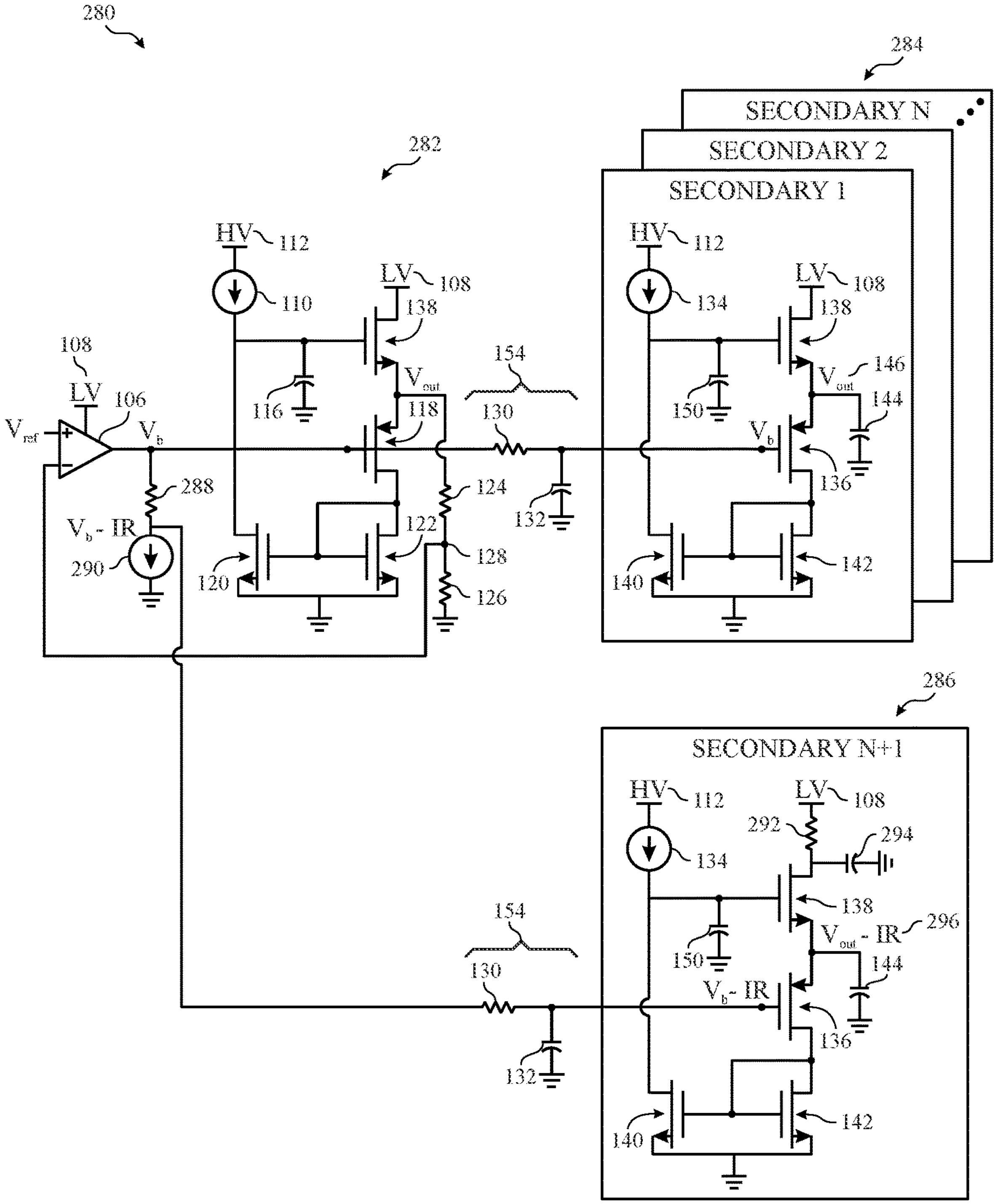
FIG. 8 is a circuit diagram of an example architecture for a primary NMOS LDO of FIG. 4B to independently control multiple secondary NMOS LDOs of FIG. 4B, according to embodiments of the present disclosure.

FIG. 8 is a circuit diagram of an example architecture 280 for a primary NMOS LDO 282 (such as the NMOS LDO 102, 104 of FIGS. 3 and 4B) to independently control multiple secondary NMOS LDOs 284 (such as the NMOS LDO 102, 104 of FIGS. 3 and 4B), according to embodiments of the present disclosure. As shown, the primary NMOS LDO 282 is coupled to a number of secondary NMOS LDOs 284. In some cases, the architecture 280 may be substantially similar to the architecture 100 of FIG. 3. The secondary NMOS LDOs (e.g., Secondary 1, 2, . . . N) 284 may be substantially similar to the NMOS LDOs 102, 104 of FIGS. 3 and 4B. However, the primary NMOS LDO 282 includes a resistor 288 and a current source 290 coupled to an output of the operational amplifier 106. As shown, the resistor 288 is coupled to the output of the operational amplifier 106 and the gate of the transistor 118. An input of the additional secondary NMOS LDO 286 may be tapped between the resistor 288 and the current source 290.

An additional secondary NMOS LDO (e.g., secondary N+1) 286 may be substantially similar to the NMOS LDOs 102, 104 of FIGS. 3 and 4B. However, the additional secondary NMOS LDO 286 includes a resistor 292 and a capacitor 294 coupled to a drain of the transistor 138. The resistor 292 and the capacitor 294 may act as a supply filter to reduce a noise of the input voltage from the primary NMOS LDO 282.

The additional secondary NMOS LDO 286 is coupled to the primary NMOS LDO 282 between the resistor 288 and the current source 290. A noise filter 154 including a resistor 130 and a capacitor 132 may be disposed between the primary NMOS LDO 282 and the additional secondary NMOS LDO 286. An input voltage of the additional secondary NMOS LDO 286 may be a voltage output (e.g., $V_b$) of the operation amplifier 106 minus a voltage determined based on a resistance of the resistor 288 and a current provided by the current source 290. That is, the primary NMOS LDO 282 may provide different input voltages to the various secondary NMOS LDOs 284, 286 by adjusting a resistance and current used to couple the secondary NMOS LDOs 284, 286 to the primary NMOS LDO 282. In this way, the input voltages of the secondary NMOS LDOs 284, 286 may be independently controlled by adjusting a current through a respective current source coupled to the primary NMOS LDO 282.

Further, an input of each secondary NMOS LDOs 284, 286 may have separate noise filtering via noise filter 154 including a resistor and a capacitor, such as the resistor 130 and the capacitor 132. The input voltage of the additional secondary NMOS LDO 286 may also control an output voltage 296 of the additional secondary NMOS LDO 286. Thus, by reducing an input voltage to the additional secondary NMOS LDO 286, the primary NMOS LDO 282 may reduce the output voltage 296 of the additional secondary NMOS LDO 286. Thus, the primary NMOS LDO 282 may support multiple output voltage levels of the secondary NMOS LDOs 284, 286.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A low dropout voltage regulator comprising:
- a current source;
- a first n-type transistor having a first gate coupled to the current source and a first source coupled to a second source of a p-type transistor;
- the p-type transistor having a first drain directly coupled to a second gate of a second n-type transistor; and
- a compensation capacitor coupled to the current source, the first gate of the first n-type transistor, and a second drain of the second n-type transistor.

2. The low dropout voltage regulator of claim 1, comprising an additional transistor having a third drain coupled to the first drain of the p-type transistor.

3. The low dropout voltage regulator of claim 2, wherein the p-type transistor and the first n-type transistor provide a feedback loop for a current of the low dropout voltage regulator.

4. The low dropout voltage regulator of claim 1, comprising:
- an additional current source; and
- a buffer transistor having a third source coupled to the first gate of the first n-type transistor and the additional current source, the buffer transistor having a third drain coupled to ground.

5. The low dropout voltage regulator of claim 4, wherein the additional current source and the buffer transistor improve a power supply rejection ratio of the low dropout voltage regulator.

6. The low dropout voltage regulator of claim 1, comprising a noise filter comprising a resistor and a filter capacitor coupled to a third gate of the p-type transistor.

7. The low dropout voltage regulator of claim 6, wherein the resistor and the filter capacitor are configured to filter noise from a reference voltage of an operational amplifier.

8. The low dropout voltage regulator of claim 6, wherein the noise filter is coupled to a second p-type transistor.

9. A low dropout voltage regulator comprising:
- a first current source;
- a compensation capacitor coupled to the first current source;
- a buffer transistor having a first gate, a first source, and a first drain, the first gate coupled to the compensation capacitor;
- a second current source coupled to the first source;
- an n-type transistor having a second gate, a second source, and a second drain, the second gate coupled to the second current source and the first source of the buffer transistor, the second source coupled to an output; and
- a p-type transistor having a third source coupled to the output.

10. The low dropout voltage regulator of claim 9, wherein the buffer transistor and the second current source comprise a source follower.

11. The low dropout voltage regulator of claim 10, wherein the source follower improves a power supply rejection ratio of the low dropout voltage regulator.

12. The low dropout voltage regulator of claim 9, wherein an impedance of the n-type transistor is less than an impedance of the p-type transistor.

13. The low dropout voltage regulator of claim 9, comprising an additional n-type transistor having a fourth drain coupled to a third drain of the p-type transistor.

14. The low dropout voltage regulator of claim 13, wherein the third drain of the p-type transistor is coupled to a third gate of the additional n-type transistor.

15. An electronic device comprising:

a primary low dropout voltage regulator comprising a first current source, an n-type transistor having a first gate coupled to the first current source and a first source coupled to an output, and a p-type transistor having a second source coupled to the first source of the n-type transistor and a first drain coupled to a second gate of a second n-type transistor; and a secondary low dropout voltage regulator coupled to the primary low dropout voltage regulator via a resistor coupled to an output of an operational amplifier and a second current source, the resistor and the second current source configured to control an input voltage of the secondary low dropout voltage regulator from the primary low dropout voltage regulator based on an output voltage of the operational amplifier.

16. The electronic device of claim 15, the primary low dropout voltage regulator comprising a compensation capacitor coupled to the first current source, the first gate of the n-type transistor and the first drain of the second n-type transistor.

17. The electronic device of claim 16, the secondary low dropout voltage regulator comprising a third current source, an additional n-type transistor having a second gate coupled to the third current source and a third source coupled to an additional output, and an additional p-type transistor having a fourth source coupled to the third source of the additional n-type transistor and a second drain coupled to a third gate of a second additional n-type transistor.

18. The electronic device of claim 15, wherein the resistor and second current source are configured to reduce the input voltage of the secondary low dropout voltage regulator based on the output voltage of the operational amplifier.

19. The electronic device of claim 15, the secondary low dropout voltage regulator comprising an additional resistor coupled to a second drain third gate of the n-type transistor and coupled to the second current source, and a capacitor coupled to the resistor and the second drain third gate, wherein the additional resistor and the capacitor comprise an input filter for the secondary low dropout voltage regulator.

20. The electronic device of claim 15, comprising an additional low dropout voltage regulator coupled to the primary low dropout voltage regulator via a second resistor and a filter capacitor, and a third current source, the third current source being configured to control an input voltage of the additional low dropout voltage regulator from the primary low dropout voltage regulator.

* * * * *